Oct. 25, 1938.  C. SAUZEDDE  2,134,584
PISTON CONSTRUCTION
Filed April 26, 1938
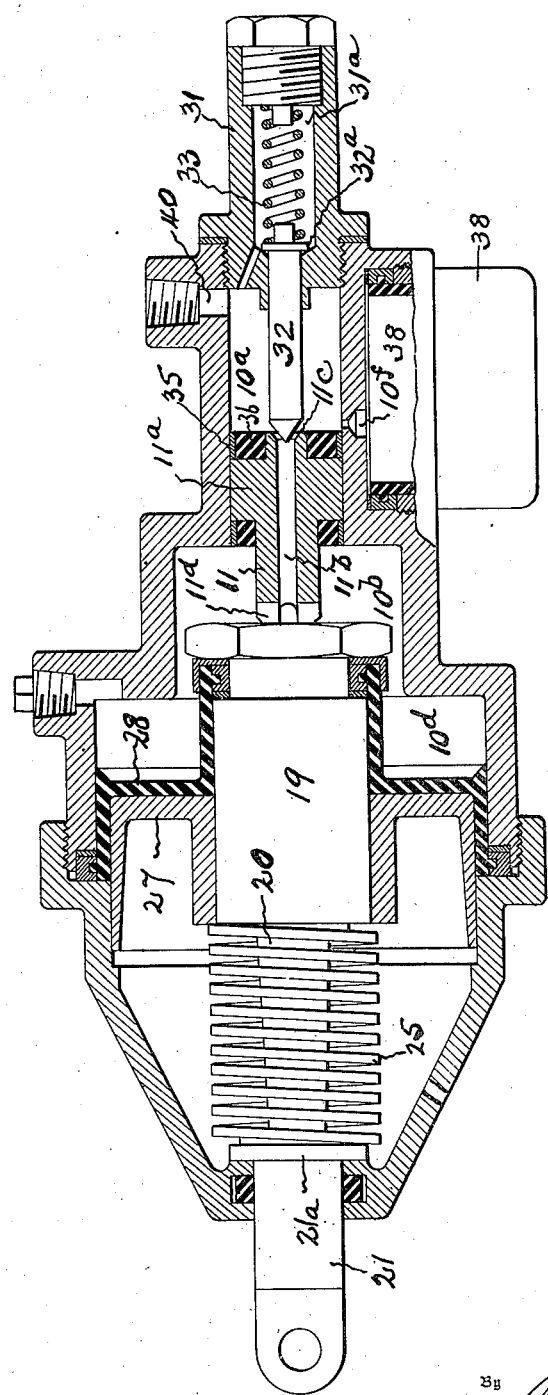
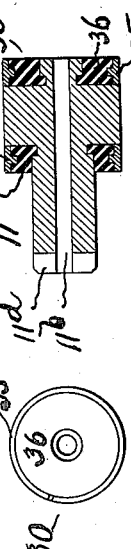
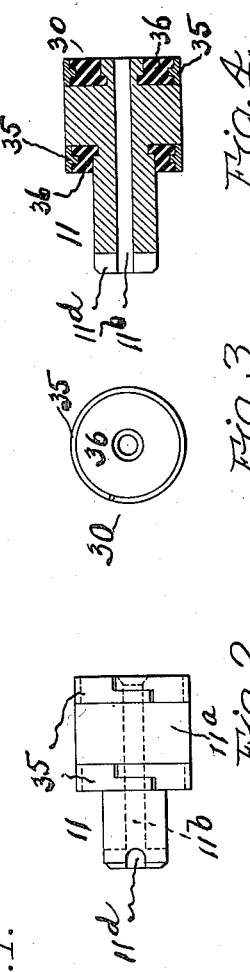
Inventor
Claude Sauzedde,
By  Attorneys Patented Oct. 25, 1938

2,134,584

UNITED STATES PATENT OFFICE 2,134,584

PISTON CONSTRUCTION

Claude Sauzedde, Detroit, Mich., assignor to Detroit Hydrostatic Brake Corporation, Detroit, Mich., a corporation of Michigan Application April 26, 1937, Serial No. 139,074

14 Claims. (Cl. 309—7)

The present invention relates to improvements in piston construction and pertains more particularly to the sealing or packing of the piston head under service conditions.

Pistons generally operate in connection with cylinder formations with the movements of the piston provided by a gaseous or a fluid medium, depending upon the particular service in which the piston is operating. In some cases the piston is moved in opposite directions by medium of this type by alternate application; in other cases it may be moved in one direction by such medium and in the opposite direction by other means, and in other cases it may be employed for moving gases or fluid mediums with the piston itself moved mechanically. Steam engines, internal combustion engines, and fluid actuators may exemplify the various uses. But in each of such uses there is present one condition that is of important consideration—leakage of the medium past the piston in presence of the pressures which may be present during the service. It is to this latter condition that the present invention pertains.

Piston rings are generally used for a service such as this, these generally being of an expansible type, the prevailing form providing an overlapping joint effect, a favorite form giving the appearance of a deformed letter "S" utilizing straight lines and with the lateral ends connected by a portion extending at right angles thereto, the former permitting expansion of the ring without affecting the ability of the latter to retain the close contact conditions that are desired. Hence, the trend is to permit leakage into the joint but not entirely through. Various ways for providing expansion of the ring are employed, these generally being arranged to be self expansible through resilience of the metal. In some cases the rings are supported by spring structures designed to normally expand the rings. In both types, the pressures which may be developed by the fluid or gaseous medium are inactive in providing the expansion of the ring, the ring resiliency or the supporting spring structure being utilized to provide the result, and the pressures have no effect in either case; steam or combustion gases may develop heat conditions such as tend to expand the metal, but the pressure of the fluid or gases has no effect in producing this result. Consequently, the effectiveness of the seal must depend upon either the resiliency of the metal or the spring support to obtain the non-leakage condition.

While structures of this type are generally accepted as efficient and are in general use, since the loss by leakage does not materially affect the operation, there are some types of service where even the small inherent leakage may be detrimental—conditions, for instance, where pressure is to be developed and maintained for a period of time. An example of such service is found in connection with brake mechanism operation where a fluid is used as a part of the operative connections between the power zone and the braking zone. The efficiency of the braking system may depend, at critical moments, upon the effectiveness of the non-leakage conditions presented through the use of a piston to provide the pressure; should the pressure drop at the critical moment serious conditions may result. Other instances can be readily perceived, the brake mechanism illustration being employed because it can visualize the possible results which can flow from lack of practically complete non-leakage conditions.

The present invention, while designed to meet the particular conditions presented through brake mechanism operation, is obviously not limited to such particular service, but is usable generally. The underlying feature of the invention is that of utilizing the pressures developed by piston operation as a means for providing an expansive effect on the ring or rings in addition to the service usually performed of providing bodily movements of the piston itself. By the use of a supporting material for the rings which is elastic and deformable, the material itself can provide sealing effects within the ring itself when subjected to the pressure, and thus not only serve to provide for ring expansion but at the same time tend to render the joint itself leakage proof. The material preferably used is rubber having elasticity characteristics such as will permit its ready deformation, and which has a comparatively large radial length in cross-section as compared with that of the ring itself, the two being suitably secured together so that the ring can be considered as formed of metallic and non-metallic zones, with the composite radius comparatively large—the exposed face of the non-metallic zone thus offering a comparatively large surface exposed to the pressure with the latter serving to deform the zone and apply pressure radially and tend to carry material into close contact with the surfaces which it is desired to protect from leakage.

To these and other ends, therefore, the nature of which will be readily understood as the invention is hereinafter disclosed, said invention consists in the improved construction and combination of parts particularly described in the following specification, illustrated in the accompanying drawing, and more particularly defined in the appended claims.

In the accompanying drawing, in which similar reference characters indicate similar parts in each of the views,—

Figure 1 is a sectional view extending longitudinally of an actuator for brake mechanism to which the present invention is applied, the latter being shown in section.

Figures 2, 3 and 4, are respectively a plan view, an end view and a longitudinal sectional view of a piston constructed in accordance with the present invention.

The actuator disclosed in Fig. 1 is of the type disclosed in my companion application for Braking systems, filed April 17, 1937, Serial No. 137,580, and in which the piston sealing means is of a different type. In the system referred to the actuator is designed to employ a pair of pistons serving to set up low and high pressure conditions, the former being active during the period when the brake-mechanism is taking up the "slack", with the high-pressure piston being alone active during actual brake-setting, during which the low-pressure piston remains under a pressure status but is inactive to apply pressure on the brakes. A brief description is given:

10a is a high-pressure chamber with an outlet 40 leading to the brake mechanism. 11 is the piston for this chamber, the piston having a longitudinal bore 11b and lateral ports 11d opening into a chamber 10b with the latter, in turn, opening into a chamber 10d of larger diameter, the latter having the low pressure piston 27; chambers 10b and 10d form the low pressure chamber. Piston 27 is carried by a member 19—being slidable thereon—the latter having its forward end in contact engagement with the rear end of piston 11; member 19 is operatively connected with a rod 20, with the latter in turn connected with a member 21 carrying a flange 21a, member 21 being operatively connected with the brake-pedal not shown. A spring 25, of greater diameter than member 19 is located between flange 21a and the rear of member 19; a portion of the forward end of the spring thus projects into a position where it can engage piston 27 at stated times. A sealing member 28 capable of elongation under advancing movements of member 19, seals the low-pressure chamber from seepage of fluid from the low pressure chamber and the admission of air into the chamber.

The forward end of bore 11b is formed as a valve-seat 11c and, adapted to co-operate therewith, is a valve 32 carried by a fitting 31 having a chamber 31a, with the valve extending into and having a flange 32a within this chamber, the chamber having an open port connection with the high pressure chamber 10a. A spring 33 supports valve 32. When the pistons are in their positions of repose with the brake-pedal inactive, valve 32 is also in its position of repose, and with its rear end spaced from the seat 11c, thus providing open communication between the low and high pressure chambers through bore 11b and the opened seat of valve 32, this being the position of the parts in Fig. 1.

The actuator forms a part of a closed system, and to meet the temperature conditions and their variations, the actuator includes an automatic fluid control unit 38 having a port 10f opening into chamber 10a at a point in immediate advance of piston 11 when the latter is in its position of repose. The unit, at this time, will compensate for any changes in the volume of the fluid of the system due to temperature changes, port 10f closing when piston 11 begins its advance.

In operation, the depression of the brake pedal starts a general cycle as follows: With the chambers filled with the fluid, piston 27 is retained in its rear position at the start of the cycle, the initiation action advancing member 21, rod 20 and member 19, to advance piston 11 which thus carries seat 11c into engagement with valve 32, thus closing communication between the high and low pressure chambers. Such advance of member 19 additionally carries its rear end out of contact with spring 25, with the result that the power value of the latter becomes active on piston 27 to advance the latter; the power value of spring 25 is greater than that of the springs of the brake-mechanism, so that spring 25 can serve as a power means for exerting power greater than the resistance of the brake mechanism as long as the brake springs alone provide the resistance—as during the period of taking up slack of the brake shoes; under these conditions, the pressure of the fluid in the low pressure chamber is greater than that of the resistance provided by valve 32 with the result that the valve is unseated and permits fluid to flow from the low pressure chamber into the high-pressure chamber enroute to the connections leading to the brake mechanism. When, however, the brake-shoes reach contact with the braking surfaces in the brake mechanism, the resistance is suddenly increased and made manifest in the high-pressure chamber; being greater than the power of spring 25, the advancing movement of piston 27 ends, and valve 32 seats, closing communication between the chambers to prevent fluid passing from the high pressure chamber through bore 11b as the piston 11 is further advanced for the brake-setting operation through pedal action.

The advancing action referred to has advanced flange 21a, which travels with member 19, so that the rear end of spring 25 is being constantly advanced while the forward end remains in contact with piston 27. When valve 32 is closed, as explained, further transfer of fluid from the low pressure chamber is ended, and hence piston 27 remains stationary, spring 25 simply compressing or yielding during the brake-setting operation; hence, during the latter period, the fluid of the low pressure chamber is being subjected to the increasing power of the spring 25, while the fluid of the high-pressure chamber is being subjected to the pressure set up by the advance of piston 11 and the resistance of the braking faces in actual contact. As the latter pressure is greatly superior, the continued advance of the piston 11 to set the brakes, can tend to cause leakage of fluid from the high-pressure chamber, even though bore 11b is closed by valve 32, and there is opposing pressure in the low pressure chamber, with the leakage point at the periphery of the piston. In the companion application, the condition is met by the use of a sealing element capable of elongation during piston advance, with a supplemental cup member in the forward zone of the piston head. The present invention is designed as a substitute for such members.

The specific arrangement employed is disclosed in the drawing. The head 11a of the piston is spaced from the advance end of the piston as shown, and is of a diameter approaching that of the cylinder in which the piston operates. The space in advance of the head—as well as a space in rear of the head—is filled by a composite element 30 the outer portion of which is in the form of a metallic piston ring 35, having overlapping ends as shown in Fig. 2, and thus capable of being expanded without completely eliminating the close contact in the overlapped zone, while the inner portion is in the form of an annular elastic member 36 of considerable radial length in cross-section, the member 36 being formed of a suitable material such, for instance, as rubber. The portion 36 is preferably keyed into annular recesses 11h of the piston, and the ring 35 may also be keyed into portion 36, as shown. As indicated, the exposed face of portion 36 at the forward end of the piston may be of greater radial length in cross-section than that at the rear of the head, since the opposing pressures of the two chambers are superior in the high-pressure chamber during the brake-setting operation.

The composite structure of ring 35 and elastic backing 36 can be provided as individuals and the assembly then made with the piston; the composite structure may have the ring and backing secured together by a vulcanizing or other process, and then the unit positioned on the piston; or the piston and rings may be included in a mold—properly positioned therein, and the elastic backing portion 36 then molded in position—this being a preferable way of producing the assembly.

As will be understood, the exposed face of the elastic portion 36 is yieldable inwardly under heavy pressure conditions, but in yielding, will set up the tendency to exert pressure radially, and since the rings 35 are expansible, will cause the latter to be placed in a tight contact relationship with the walls of the cylinder forming the high-pressure chamber—the greater the pressure within that chamber, the tighter becomes the contact. A similar action will take place with the rear composite structure from the pressure within the low-pressure chamber. During the slack period of brake advance, the resistance set up by the brake springs will provide little effect with respect to the advance side, while the open bore 11b at such time offers an open pathway so that practically no deformation takes place at the rear. Hence, during the slack period, the rings 35 would have normal contact relationship with the cylinder walls and thus permit ready movement of the piston in the advancing direction.

When the slack is taken up, however, and the sudden heavy resistance set up through contact of the opposing brake faces, valve 32 closes, as above indicated, so that the pressures of both chambers become active as deforming agencies with respect to the elastic portion 36 with the result that the rings 35 are moved into their tight contact status with the cylinder walls, and since the two rings are spaced and each is being subject to the pressure conditions, the close fit set up is of series characteristic, making it difficult for any leakage to occur past the pair of rings, as the piston is advanced during the brake-setting operation. The contact between rings and cylinder walls remains as of a metallic contact status, so that the arrangement can take care of wear without affecting the unit as an entirety, providing for long life of the assemblage. In addition, there may be a tendency for the elastic material, during deformation, to tend to close any space conditions within the ring on the inner surface of the latter, thus tending to decrease possibility of leakage through the joint itself.

Continuing with the description of the actuator operation, it will be understood that as the pressure of the high-pressure chamber increases, as the piston 11 advances during brake-setting, so will the deformation effect increase to increase the leakage-prevention. And the piston can be held at its advanced position any desired time—with the brakes fully set—without any material leakage or seepage of fluid past the seal that is thus set up. When it is desired to release the brakes, the pedal is released, which thus eliminates the pressure which is retaining piston 11 in its advance position, with the result that the brake springs and spring 25 can rapidly—and practically instantaneously—return piston 11, member 19, rod 20 and member 21 to the positions of Fig. 1, spring 33 retaining valve 32 closed until flange 32a contacts the fitting, whereupon bore 11b is opened as piston continues its movement. During this period spring 25 remains active upon piston 27 to retain it in its advance position, until the rear end of member 19 engages the forward end of spring 25, whereupon the power of the latter on piston 27 ends, spring 25 returning bodily with the unit made up of members 19 and 21 with the intervening rod 20. As long as bore 11b remains closed, piston 27 has no material movement in the return direction; when the bore is opened, the continued power of the brake springs serves to move the fluid through bore 11b into the low pressure chamber, and since there is then no resistance to the returning movement of piston 27, the latter returns to the position of Fig. 1 of the drawing, leaving the parts ready for the succeeding brake-application at will. In this position, the compensating unit 38 is active to make any compensating effect upon the volume of fluid within the fluid flow path.

As will be understood, in this development just described, the instant the pedal was released, the power which was opposing the resistance of the brake mechanism is released so far as piston 11 is concerned. Hence, the previous high pressure condition within chamber 10a is initially exerted in rapidly shifting this piston to its position of rest. This tends to reduce the pressure on the elastic backing portion 36, and tends to permit the deformation to become less and thus relieve the close fit of the rings 35, permitting greater freedom during the return movement of the piston 11. Even if slight seepage should then take place there would be no detrimental effect, since at this time there is no desire to retain the high pressure condition within chamber 10a and the fluid which had been received therein from the low pressure chamber during the advance will be returned to the low pressure chamber at any rate.

From the above, it will be readily understood that the piston assembly disclosed provides for very high efficiency conditions when employed in a use such as the above—conditions where a portion of the operation does not provide conditions such as would tend to set up seepage and another part of the operation during which seepage would not be damaging, but providing for very high leakage prevention during that portion of the operation where seepage would be likely otherwise. In other words, under conditions where likelihood of seepage and any damaging effects are present, the structure automatically takes up the service while at other times the structure would tend to render piston operation with greater ease.

Under such conditions the assemblage tends in the direction of an automatically-compensating piston ring or packing formation by means of which the pressure of the chamber or chambers is itself active in determining somewhat of the pressure value with which the rings contact the cylinder walls. Where the structure is designed to be used with a single chamber mechanism, but one of the composite ring structures would be utilized; a second composite ring structure could be employed, but in the absence of pressure on the exposed face of the elastic portion the deformation effect would not be present.

A number of definite advantages are present in addition to the above. For instance, the commercial piston ring of the lapped joint type is generally made slightly oversize, with the result that when it is positioned for service, it has been slightly compressed. Under these conditions there is a tendency for the ring to lose its exactness in circular contour with the result that leakage is present; in addition, the ring depends on its own resiliency to maintain the proper position, and hence must be of considerable width in radial cross-section. Due to the fact that the assemblage structure described herein not only employs the ring formation but additionally supports it through the elastic inner portion, it is evident that the radial thickness of the ring may be materially less than the commercial form, thus making it possible for the radially expanding pressure of the inner portion to force the ring periphery into close contact with the opposing wall of the cylinder in which the piston operates and thus tend to eliminate the "out-of-round" conditions referred to, and thereby ensuring a more accurate relationship between ring and cylinder wall.

As above pointed out, the ring and elastic portion may be individuals—in which case the inner portion carries the inwardly-projecting rib for positioning the member on the piston body; or the inner and outer zones may be united together and treated as a composite unit positionable on the piston; or, the assemblage may be applied by assembling the piston and ring properly within a mold providing the elastic portion by a vulcanizing action—the assemblage of the unit referred to would be obtainable in similar manner with the ring in place in the mold. In producing the unit or the complete assemblages an especial advantage is possible, since the material of the elastic zone could then extend into and fill the spaces of the ring joint during vulcanization; if the ring is oversized, the compression of the ring simply compresses the material of the spaces to tend to force material outwardly and laterally, thus providing an elastic material barrier within the spaces, with the barrier active against the possibility of the pressure of the chamber causing leakage through the joint, and eliminating the necessity for depending upon the overlapping portions of the joint to alone prevent such leakage; any expansion of the ring in place, simply permits the material of the space to re-enter the space and maintain the sealed conditions. Hence, the united assemblage or the complete assemblage is a preferable form of use, due to the fact that it enables a more complete filling of the spaces in the ring joint than in the separate forms.

From the above it will be understood that the piston, when equipped with the two zones referred to—whether separate or united—will provide superior leakage-prevention in service, whether the pressure is provided by piston movement alone or otherwise, and with the contact of the opposing surfaces of the outer zone of the piston ring and the cylinder wall presenting not only the fitted characteristic but with the sealing effect increasing as the pressure itself increases—when the need is greatest for the protection, the cause for such need is itself the agency which provides the increasing protection for the leakage; the pressure value determines the expansion value applied to the metallic outer zone. Hence, the arrangement provides for self-compensation effects such as to reduce the leakage possibilities to a minimum.

While I have herein disclosed a preferred embodiment of the invention together with various ways in which it may be provided and employed, it will be readily understood that changes and modifications therein may be found desirable or essential to meet various exigencies of use and the preference of users, and I therefore reserve the right to make any and all such changes or modifications therein as may be found desirable or essential, insofar as the same may fall within the spirit and scope of the invention as expressed in the following claims when broadly construed.

What I claim as new is:

1. In piston construction, a piston having a body and a head, and a leakage-preventing assemblage carried by the piston in advance of the head and including an annular metallic external expansible member and an annular elastic support therefor normally filling the radial space between the member and the piston body and having an exposed face, whereby the exposed face of the support will be subject to pressure conditions during piston advance to thereby deform the support and subject the member to expansion pressure produced by the elastic support.

2. A piston construction as in claim 1 characterized in that the head is spaced from the advance end of the piston body, the advance side face of the head constituting a wall against which the elastic support abuts with the wall forming a resistance active in producing support deformation.

3. A piston construction as in claim 1 characterized in that the elastic support and piston body have complemental configurations to provide an anchored relation of the support relative to the body.

4. A piston construction as in claim 1 characterized in that the elastic support and expansible member have complemental configurations to provide an anchored relation of the support and the member.

5. A piston construction as in claim 1 characterized in that the elastic support and expansible member are facially united to provide a composite unit.

6. In piston construction, a piston having a body and a head with the head spaced from the advance end of the body, and independent leakage-preventing assemblages carried by the body with one assemblage forward of the head and another in rear of the head, each assemblage including an annular metallic expansible outer member and an annular elastic support therefor normally filling the radial space between the member and the piston body and having an exposed face opposite a wall of the head, whereby the exposed face of the support may be subjected to pressure conditions to thereby deform the support and subject the outer member to expansion pressure produced in deforming the support.

7. A piston construction as in claim 6 characterized in that the radial depth of the support is greater in one assemblage than in the other.

8. As a means for producing leakage prevention of pistons, a piston body having a head spaced from its advance end, and an annular assemblage supported by the body in advance of the head and expansible in presence of pressure produced by piston advancing movements, said assemblage having a metallic outer zone and an inner elastic supporting zone therefor with a face of the inner zone exposed to the pressure of the chamber of which the piston forms a wall, whereby assemblage expansion value is determined by the chamber pressure value.

9. Means as in claim 8 characterized in that the outer metallic zone is annular and expansible and the inner elastic zone is annular and of elastic material deformable under such chamber pressure to provide the expansion of the outer zone.

10. As a means for producing leakage prevention of pistons, a piston body having a head spaced from its advance end, said body carrying independent annular assemblages in advance and in rear of the head, with each assemblage expansible in presence of pressure applied axially in the direction of the head, each assemblage being suported by the piston body and having a metallic outer zone and an elastic inner supporting zone for such outer zone with a face of the elastic zone exposed to thereby provide deformation of the elastic zone in presence of pressure applied to such face and with the deformation active in producing expansion pressure upon the outer metallic zone, said assemblages providing individual leakage-preventing zones spaced apart by the head with the expansion value of an assemblage determined by the pressure value applied to the exposed face, whereby the leakage-prevention may be provided by either assemblage or by both assemblages with the expansion value of the assemblages individually determined by the pressure conditions under which the piston is operating.

11. In actuator construction, an assembly having high and low pressure chambers with individual pistons for producing the pressure values, said assembly having its high-pressure piston provided with a pair of spaced annular expansible assemblages each having an outer metallic expansible zone and an inner elastic zone, said elastic zones each having a face exposed to the pressure of a chamber with the assemblages positioned to present the exposed face of the elastic zone of one assemblage to the pressure of the low pressure chamber and the exposed face of the elastic zone of the other assemblage to the pressure of the high pressure chamber, the expansion value of each assemblage being determined by the pressure value of the chamber to which the exposed face of the elastic zone is exposed.

12. A piston structure as in claim 1 characterized in that the metallic member is in the form of a piston ring of the overlapping joint type and facially united to the elastic member with the latter filling spaces at ends of the ring structure.

13. As an article of manufacture, a leakage-preventing assemblage for pistons, said assemblage being annular and comprising an outer metallic annular expansible zone and an inner zone of elastic deformable material united to the outer zone with the elastic zone of materially greater radial depth than the outer metallic zone and with the elastic zone including a face adapted to be exposed to pressure exerted in the direction of the assemblage axis to thereby provide expansion of the outer zone by deformation of the elastic zone by such pressure.

14. An article as in claim 13 characterized in that the outer metallic zone is in the form of a piston ring of the overlapped-end type and having spaces at such ends filled by the material of the elastic zone.

CLAUDE SAUZEDDE.